United States Patent
Chae et al.

(10) Patent No.: US 12,234,350 B2
(45) Date of Patent: Feb. 25, 2025

(54) OLEFIN-BASED ELASTOMER COMPOSITE RESIN COMPOSITION FOR AIRBAG CHUTE, COMPRISING DENDRIMER

(71) Applicant: CEPLA CO., LTD., Asan-si (KR)

(72) Inventors: Chang Won Chae, Seoul (KR); Sung Yeon Lee, Seoul (KR); Chang Min Hong, Anyang-si (KR); Jong Soo Park, Incheon (KR); Jae Myung Rhee, Seoul (KR); Jin Young Huh, Goyang-si (KR); Kyu Haeng Cho, Yesan-gun (KR); Dae Keun Kim, Daejeon (KR); Gwang Ho Go, Seoul (KR); Poong Hyun Choi, Incheon (KR)

(73) Assignee: CEPLA CO., LTD., Asan-si (KR)

( * ) Notice: Subject to any disclaimer, the term of this patent is extended or adjusted under 35 U.S.C. 154(b) by 931 days.

(21) Appl. No.: 17/312,526

(22) PCT Filed: Jul. 2, 2019

(86) PCT No.: PCT/KR2019/008078
§ 371 (c)(1),
(2) Date: Jun. 10, 2021

(87) PCT Pub. No.: WO2020/122340
PCT Pub. Date: Jun. 18, 2020

(65) Prior Publication Data
US 2022/0056254 A1    Feb. 24, 2022

(30) Foreign Application Priority Data
Dec. 12, 2018  (KR) .................. 10-2018-0159834

(51) Int. Cl.
| C08L 23/12 | (2006.01) |
| B60R 21/20 | (2011.01) |
| C08L 23/0807 | (2025.01) |
| C08L 53/00 | (2006.01) |

(52) U.S. Cl.
CPC .............. *C08L 23/12* (2013.01); *B60R 21/20* (2013.01); *C08L 23/0815* (2013.01); *C08L 53/00* (2013.01)

(58) Field of Classification Search
CPC ....... C08L 23/12; C08L 23/16; C08L 101/005
See application file for complete search history.

(56) References Cited

U.S. PATENT DOCUMENTS

| 5,886,064 A | 3/1999 | Rheinberger et al. |
| 9,359,498 B2 | 6/2016 | Mikami et al. |
| 2015/0191590 A1* | 7/2015 | Mikami ................ B60R 21/215 |
| | | 525/89 |

FOREIGN PATENT DOCUMENTS

| CN | 106939124 A | | 7/2017 | |
| CN | 111690206 A | * | 9/2020 | .......... C08F 255/023 |
| JP | 08-231864 A | | 9/1996 | |
| JP | 2009-155412 A | | 7/2009 | |
| JP | 2012031394 A | * | 2/2012 | |
| JP | 6213090 B2 | | 10/2017 | |
| KR | 10-2013-0118856 A | | 10/2013 | |
| WO | 2011/155947 A1 | | 12/2011 | |

OTHER PUBLICATIONS

International Searching Authority, International Search Report for PCT/KR2019/008078 dated Oct. 7, 2019 [PCT/ISA/210].

* cited by examiner

*Primary Examiner* — Mark S Kaucher
(74) *Attorney, Agent, or Firm* — Sughrue Mion, PLLC

(57) ABSTRACT

A polyolefin thermoplastic elastomer composition for an airbag chute, includes a polypropylene, an olefin block copolymer, and a dendrimer as a material applied to a raw material of a passenger airbag chute. An olefin elastomer composite resin composition for an airbag chute includes 30-80 parts by weight of a polypropylene resin, 30-70 parts by weight of an olefin block copolymer, and 0.1-5 parts by weight of a dendrimer based on 100 parts by weight of the olefin elastomer composite resin composition. The olefin elastomer composite resin composition for an airbag chute, improves the dispersion of the elastomer by applying a high-flow elastomer and a low-flow polypropylene, and improves flowability and meltability characteristics without deteriorating physical properties by applying the dendrimer.

8 Claims, No Drawings

OLEFIN-BASED ELASTOMER COMPOSITE RESIN COMPOSITION FOR AIRBAG CHUTE, COMPRISING DENDRIMER

CROSS-REFERENCE TO RELATED APPLICATION

This application is a National Stage of International Application No. PCT/KR2019/008078 filed Jul. 2, 2019, claiming priority based on Korean Patent Application No. 10-2018-0159834, filed Dec. 12, 2018, in the Korean Intellectual Property Office, the disclosure of which is incorporated herein in its entirety by reference.

BACKGROUND

1. Field

The present invention relates to a polyolefin thermoplastic elastomer composition for an airbag chute, including polypropylene, an olefin block copolymer, and a dendrimer as a material applied to a raw material of a passenger airbag chute. In particular, the present invention aims to improve physical properties by including a dendrimer in a composition and to improve flowability.

2. Description of Related Art

Airbags are the most important protection device for passenger safety in automobiles and have to be able to show performance in various environments. Accurate response to impacts has to be made in environments where the temperature of the automobile falls to an extreme temperature of −35° C. in winter and rises to 80° C. under the intense midday sun in summer. Therefore, materials surrounding the airbags also have to be able to withstand the same environments. In other words, the airbags have to be made of materials that can withstand the high speed and strong impact of the airbags erupted with intense explosive power.

Materials that dominate the airbag chutes are polypropylene and ethylene propylene diene monomer (EPDM). The EPDM has been used as an impact modifier for polypropylene for a long time and is still used as an impact modifier today. When the content of the EPDM is about 60%, it is confirmed through evaluation that the EPDM can withstand impact and there is no change in physical properties even at high temperatures. The EPDM has an ethylene-propylene-diene structure, and hard segments of ethylene and propylene are soft segments of diene, which adds flexibility to the structure. In addition, due to the diene structure, a double bond can be maintained even after reaction with ethylene-propylene. The double bond can be opened by peroxide to form a crosslinked structure, which plays an important role in improving physical properties of the EPDM. In terms of heat resistance, it brings a high increase, but there is a disadvantage that recycling is impossible.

Therefore, airbag chute materials currently used are partially crosslinked for recycling or are manufactured in a non-crosslinked form. However, in this case, a double bond remains in the structure, making it vulnerable to external stimuli such as heat and ultraviolet rays. In addition, the EPDM is mainly provided in the form of a veil, is processed by a batch-type mixer such as a bambury or an internal mixer, and cannot be used directly in a twin screw extruder, which is a continuous process.

A combination of polypropylene and SEBS is also used as the material for the airbag chute. The SEBS is prepared by polymerization of styrene-ethylene-butadiene and is used in interior and exterior parts for automobiles and home appliances. Since the SEBS has an excellent balance between impact characteristics and stiffness, the SEBS is useful for improving the impact and stiffness of composite materials. However, low-temperature characteristics are disadvantageous compared to other elastomers and are difficult to use alone. Therefore, a combination of polypropylene and olefin elastomer is used. The olefin elastomer is a composition of ethylene and α-olefin and has excellent compatibility with polypropylene. Therefore, the olefin elastomer is widely used for automobiles as a substitute for EPDM. In particular, low-temperature characteristics can be improved and mechanical properties can be controlled by controlling the content of α-olefin. When low-temperature characteristics are improved, low-temperature impact is improved, but a melting point is also lowered, which deteriorates high-temperature characteristics. Therefore, there is a need to develop an airbag chute material having characteristics that can be satisfied in both the low-temperature environment and the high-temperature environment required for automobiles.

Japanese Patent Registration No. 6319090 discloses an airbag storage cover having excellent high-temperature strength and low-temperature impact resistance. However, by disclosing an olefin block copolymer including a polymer block of a polypropylene resin component and ethylene and a block of ethylene and an α-olefin copolymer having 4-8 carbon atoms, a material to which a low-flow elastomer and high-flow polypropylene are applied is developed. However, there is a limitation in that the dispersion of the elastomer cannot be improved by applying a high-flow elastomer and low-flow polypropylene. Therefore, the present invention has been completed in order to compensate for insufficient flowability.

CITATION LIST

Patent Literature (Patent Literature) Japanese Patent Registration No. 6213090 (2017 Sep. 9.)

SUMMARY

The present invention aims to solve the above-described problems of the related art and the technical problems.

In the present invention, polypropylene and olefin block copolymer may be used for improving high-temperature characteristics of an olefin elastomer.

An object of the present invention is to provide an olefin elastomer composite resin composition that improves the dispersion of the elastomer by applying a high-flow elastomer and a low-flow polypropylene, and in particular, significantly improves flowability by including a dendrimer, without deteriorating physical properties.

In order to achieve the above-described objects of the present invention and achieve the characteristic effects of the present invention described below, the characteristic construction of the present invention is as follows.

According to one embodiment of the present invention, an olefin elastomer composite resin composition for an airbag chute includes 30-80 parts by weight of a polypropylene resin, 30-70 parts by weight of an olefin block copolymer, and 0.1-5 parts by weight of a dendrimer based on 100 parts by weight of the total composition.

According to one embodiment of the present invention, the olefin block copolymer includes an ethylene and α-olefin polymer.

According to one embodiment of the present invention, α-olefin in the ethylene and α-olefin polymer has 4-10 carbon atoms.

According to one embodiment of the present invention, the polypropylene resin has a flow index of 5-10 g/10 min at 230° C. and a load of 2.16 kg.

According to one embodiment of the present invention, a flow index of the olefin block copolymer is 10-20 g/10 min at 190° C. and a load of 2.16 kg, a melting temperature is 115° C. to 125° C., and a softening temperature at low temperature is −60° C. to −70° C.

According to one embodiment of the present invention, a flow index of the dendrimer is 0.1-50 g/10 min at 190° C. and a load of 2.16 kg, and a density of the dendrimer is 0.93-0.95.

According to one embodiment of the present invention, the dendrimer has at least one selected from the group consisting of olefin-based, nylon-based, amine-based, and acrylate-based terminal functional groups.

According to one embodiment of the present invention, the dendrimer is polymerized through a divergent synthesis method (multi active site).

According to one embodiment of the present invention, the polypropylene resin includes a propylene homopolymer or a copolymer of propylene and a monomer of at least one selected from the group consisting of ethylene, 1-butene, 1-pentene, 1-hexene, 1-heptene, and 1-oxene.

DETAILED DESCRIPTION

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention.

Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

According to an embodiment of the present invention, an olefin elastomer composite resin composition for an airbag chute includes 30-80 parts by weight of a polypropylene resin, 30-70 parts by weight of an olefin block copolymer, and 0.1-5 parts by weight of a dendrimer based on 100 parts by weight of the total composition.

The polypropylene resin is included in an amount of 30-80 parts by weight based on 100 parts by weight of the total composition. When the amount of the polypropylene resin is less than 30 parts by weight, heat resistance, moldability, product appearance, and the like are affected. When the amount of the polypropylene resin is greater than 80 parts by weight, flexibility is lowered. Preferably, the polypropylene resin is included in an amount of 40-70 parts by weight.

The olefin block copolymer is included in an amount of 30-70 parts by weight based on 100 parts by weight of the total composition. When the amount of the olefin block copolymer is less than 30 parts by weight, tensile property is lowered at high temperature. When the amount of the olefin block copolymer is greater than 70 parts by weight, hardness is lowered and the role as the airbag cover for the automobile is deteriorated. Preferably, the olefin block copolymer is included in an amount of 40-60 parts by weight.

The dendrimer is included in an amount of 0.1-5 parts by weight based on 100 parts by weight of the total composition. When the amount of the dendrimer is within this range, it helps to improve flowability. Preferably, the dendrimer is included in an amount of 0.5-1 part by weight. More preferably, a dendrimer CYD214C is provided. This is a powder-type dendrimer for improving flowability. The dendrimer may be applied to a high-flow elastomer and a low-flow polypropylene to provide improved dispersion of the elastomer. Therefore, it can be confirmed that, in order to improve insufficient flowability, the dendrimer is applied to disperse the high-flow elastomer in the polypropylene resin, thereby efficiently improving flowability without deterioration of physical properties. The dendrimer according to the embodiment of the present invention is included to increase flowability and improve molding speed, density stability, and the like. In particular, the dendrimer has not been introduced into the airbag chute. By introducing the dendrimer into the olefin elastomer composite resin composition for the airbag chute, it is possible to provide a composition that contributes to improving the flowability of the composition and satisfies physical properties such as density stability and strength.

The polypropylene resin may include a homopolymer or a copolymer. The polypropylene resin may include a propylene homopolymer, and may include a copolymer of propylene and a monomer of at least one selected from the group consisting of 1-butene, 1-pentene, 1-hexene, 1-heptene, and 1-oxene, but the present invention is not limited thereto.

An α-olefin polypropylene resin may be included to enhance heat resistance and morphology. As the amount of the propylene increases, heat resistance or strength may increase. Therefore, the polypropylene resin may be prepared through a known method by those of ordinary skill in the art.

In the olefin elastomer composite resin composition for the airbag chute according to the embodiment of the present invention, the olefin block copolymer is a block copolymer including an ethylene and α-olefin polymer.

In the olefin elastomer composite resin composition for the airbag chute according to the embodiment of the present invention, α-olefin in the ethylene and α-olefin polymer has 4-10 carbon atoms having a double bond of carbon at the terminal. Preferably ethylene, 1-butene, 3-methyl-1-butene, 1-pentene, 4-methyl-1-pentene, 3-methyl-1-pentene, 1-hexene, and the like may be provided, but the present invention is not limited thereto.

In the olefin elastomer composite resin composition according to the embodiment of the present invention, a flow index of the polypropylene resin is 5-50 g/10 min at 230° C. and a load of 2.16 kg. A melt flow rate (MFR) can be measured by a manual mass measurement method (ISO 1133, measured at 230° C. and a load of 2.16 kg), and the MFR is preferably 5-10 g/10 min. When the MFR is less than 5 g/10 min, an appearance of a molded article and injection molding may be deteriorated, and when the MFR is greater than 50 g/10 min, there may be a problem in strength and heat resistance of a composition at high temperature.

In the olefin elastomer composite resin composition according to the embodiment of the present invention, a flow index of the olefin block copolymer is 10-50 g/10 min at 190° C. and a load of 2.16 kg, a melting temperature is 115° C. to 125° C., and a softening temperature at low temperature is −60° C. to −70° C. An MFR of the olefin block copolymer can be measured by a manual mass measurement method (ISO 1133, measured at 190° C. and a load of 2.16 kg), and the MFR is preferably 10-20 g/10 min. When the melting temperature is lower than 115° C., moldability is deteriorated, and when the melting temperature is higher than 230° C., heat resistance is lowered.

The olefin block copolymer according to the embodiment of the present invention may include an ethylene polymer and an ethylene/olefin polymer. The ethylene polymer mainly includes ethylene and may include olefin. In addition, one or more olefins may be included, and α-olefins may be preferably included. For example, ethylene/1-butene copolymers, ethylene/1-hexene copolymers, and ethylene/1-propylene and ethylene/1-octene copolymers may be provided, but the present invention is not limited thereto. In addition, one or more selected from the group consisting of derivatives thereof may be provided. The α-olefins may be partially crystalline or amorphous.

The dendrimer according to the embodiment of the present invention refers to a polymer in which a certain unit structure having a branch shape repeatedly extends from a core. The dendrimer has an empty center and has a reaction group capable of reacting with various chemical units at the outside. A step in which the dendrimer grows is called "generation". In the present invention, when a constantly repeated unit structure is added to the dendrimer, it is defined as generation accordingly. Unlike polymers such as polyethylene or polypropylene, the dendrimer has an advantage of being capable of perfectly controlling the molecular weight and surface functional groups in the synthesis process. The dendrimer is a compound in which a spherical branch is regularly developed through repetition of certain structures and has very excellent flowability characteristics as a polymer in which a structure is controlled from a molecular level.

The main reason for the excellent flow characteristics of the dendrimer is that the dendrimer is structurally very dense and the occupied volume thereof is small compared to the molecular weight, and thus the viscosity resistance during flow is very small. Research using dendrimers so as to improve the flowability of polymers is being conducted very actively, and the present invention also contributes greatly to improving the flowability.

In the olefin elastomer composite resin composition for the airbag chute according to the embodiment of the present invention, a flow index of the dendrimer is 0.1-50 g/10 min at 190° C. and a load of 2.16 kg, and a density of the dendrimer is 0.93-0.95. An MFR of the dendrimer can be measured by a manual mass measurement method (ISO 1133, measured at 190° C. and a load of 2.16 kg), and the MFR is preferably 0.1-10 g/10 min. When the dendrimer is applied in the above range, there is an effect of providing the olefin elastomer composite resin composition for the airbag chute, which has improved flowability and melting characteristics without deteriorating physical properties.

In the olefin elastomer composite resin composition for the airbag chute according to the embodiment of the present invention, the dendrimer is generations 1 to 10. Preferably, generations 3 to 7 are provided. Within this range, the flowability increases and the molding speed, the density stability, and the like are improved.

In the olefin elastomer composite resin composition according to the embodiment of the present invention, the dendrimer has at least one selected from the group consisting of olefin-based, nylon-based, amine-based, and acrylate-based terminal functional groups.

In the olefin elastomer composite resin composition for the airbag chute according to the embodiment of the present invention, the dendrimer is polymerized through a divergent synthesis method (multi active site).

The divergent synthesis method is a synthetic method that increases an outer structure by repeating activation and growth step by step from one central molecule. The synthesis of the outermost part that determines the physical and chemical properties of the dendrimer is done at the end. Therefore, it is easy to synthesize the dendrimer having various physical and chemical properties by the change in the outermost terminal group introduced after the basic internal structure is formed. While the general polymer synthesis method is difficult to control, the dendrimer synthesis method may increase the generations through a step-by-step growth process to provide homogeneous molecules in which a polydispersity index (PDI) of a macromolecular weight is close to approximately 1.

The high-flow elastomer and the low-flow polypropylene according to the embodiment of the present invention are applied to improve the dispersion of the elastomer, and the dendrimer is applied to improve the insufficient flowability. After dispersing the high-flow elastomer in the polypropylene resin, the flowability is efficiently improved through the dendrimer without deterioration of physical properties. In addition, polymerization is performed through multi active sites as the polymerization method. Even when the molecular weight is increased, the structures such as a lamella structure or a polymer chain entanglement, which are the characteristics of the existing polymers, do not occur. A structure in which numerous branches are connected with respect to the central point is formed. Therefore, excellent flowability and melting characteristics are provided.

In the olefin elastomer composite resin composition according to the embodiment of the present invention, the polypropylene resin may include a propylene homopolymer or a copolymer of propylene and a monomer of at least one selected from the group consisting of ethylene, 1-butene, 1-pentene, 1-hexene, 1-heptene, and 1-oxene, but the present invention is not limited thereto.

The present invention will be described in more detail in the following examples. However, the following examples are merely illustrative of the present invention, and the contents of the present invention are not limited by the following examples.

In addition, the present invention may further include, in addition to the above components, lubricants, antioxidants, light stabilizers, release agents, antistatic agents, crosslinking agents, antibacterial agents, processing aids, metal desulfurization agents, anti-friction wear agents, coupling agents, TALC, and the like, and is not limited thereto.

Hereinafter, the present invention will be described in more detail through examples and experimental examples according to the present invention, but the scope of the present invention is not limited by the examples presented below.

EXAMPLES

Example 1

Prepared was an olefin elastomer composite resin composition for an airbag chute, including 20 parts by weight of a polypropylene resin (SK, HCPP, BX3900), 25 parts by weight of a polypropylene resin (Korea Petrochemical Ind. Co., Ltd., HCPP, CB5230), 52 parts by weight of an olefin block copolymer (DOW, POE, XLT8677), and 3 parts by weight of a dendrimer (CYD6100) based on 100 parts by weight of the total composition.

Example 2

Prepared was an olefin elastomer composite resin composition for an airbag chute, including 20 parts by weight of a polypropylene resin (SK, HCPP, BX3900), 26 parts by weight of a polypropylene resin (Korea Petrochemical Ind. Co., Ltd., HCPP, CB5230), 52 parts by weight of an olefin block copolymer (DOW, POE, XLT8677), and 2 parts by weight of a dendrimer (CYD6100) based on 100 parts by weight of the total composition.

Example 3

Prepared was an olefin elastomer composite resin composition for an airbag chute, including 20 parts by weight of a polypropylene resin (SK, HCPP, BX3900), 25 parts by weight of a polypropylene resin (Korea Petrochemical Ind. Co., Ltd., HCPP, CB5230), 55 parts by weight of an olefin block copolymer (DOW, POE, XLT8677), and 0.5 parts by weight of a dendrimer (CYD214C) based on 100 parts by weight of the total composition.

Example 4

Prepared was an olefin elastomer composite resin composition for an airbag chute, including 20 parts by weight of a polypropylene resin (SK, HCPP, BX3900), 25 parts by weight of a polypropylene resin (Korea Petrochemical Ind. Co., Ltd., HCPP, CB5230), 55 parts by weight of an olefin block copolymer (DOW, POE, XLT8677), and 1 parts by weight of a dendrimer (CYD214C) based on 100 parts by weight of the total composition.

Example 5

Prepared was an olefin elastomer composite resin composition for an airbag chute, including 10 parts by weight of a polypropylene resin (SK, HCPP, BX3900), 42 parts by weight of a polypropylene resin (Korea Petrochemical Ind. Co., Ltd., HCPP, CB5230), 46 parts by weight of an olefin block copolymer (DOW, POE, XLT8677), and 2 parts by weight of a dendrimer (CYD6100) based on 100 parts by weight of the total composition.

Example 6

Prepared was an olefin elastomer composite resin composition for an airbag chute, including 10 parts by weight of a polypropylene resin (SK, HCPP, BX3900), 42 parts by weight of a polypropylene resin (Korea Petrochemical Ind. Co., Ltd., HCPP, CB5230), 46 parts by weight of an olefin block copolymer (DOW, POE, XLT8677), and 0.5 parts by weight of a dendrimer (CYD214C) based on 100 parts by weight of the total composition.

Comparative Example 1

Prepared was an olefin elastomer composite resin composition for an airbag chute, including 20 parts by weight of a polypropylene resin (SK, HCPP, BX3900), 25 parts by weight of a polypropylene resin (Korea Petrochemical Ind. Co., Ltd., HCPP, CB5230), and 55 parts by weight of an olefin block copolymer (DOW, POE, XLT8677) based on 100 parts by weight of the total composition.

Comparative Example 2

Prepared was an olefin elastomer composite resin composition for an airbag chute, including 10 parts by weight of a polypropylene resin (SK, HCPP, BX3900), 44 parts by weight of a polypropylene resin (Korea Petrochemical Ind. Co., Ltd., HCPP, CB5230), and 46 parts by weight of an olefin block copolymer (DOW, POE, XLT8677) based on 100 parts by weight of the total composition.

Experimental Example

Physical properties of the compositions prepared according to Examples 1 to 6 were tested. A melt index (MI) was measured in a condition of 230° C./2.16 kg by using ISO 1133. Specific gravity was measured by using ISO 1183, and tension was measured under a speed condition of 50 mm by using ISO 527. Flexural modulus was measured under a speed condition of 2 mm by using ISO 178, and impact strength was measured at a low temperature of −40° C. by a Notched Charpy test.

For Examples 1 to 6 and Comparative Examples 1 and 2, the contents of the compositions are summarized and shown in Table 1.

In addition, for Examples 1 to 6 and Comparative Examples 1 and 2, the results of evaluating mechanical properties according to the experimental example are summarized and shown in Table 2.

TABLE 1

| Raw material name | Example 1 | Example 2 | Example 3 | Example 4 | Example 5 | Example 6 | Comparative Example 1 | Comparative Example 2 |
|---|---|---|---|---|---|---|---|---|
| SK BX3900 | 20 | 20 | 20 | 20 | 10 | 10 | 20 | 10 |
| Korea Petrochemical Ind. Co., Ltd. CB5230 | 25 | 26 | 25 | 25 | 42 | 43.5 | 25 | 44 |
| DOW XLT8677 | 52 | 52 | 55 | 55 | 46 | 46 | 55 | 46 |
| Dendrimer, CYD214C | — | — | 0.5 | 1 | — | 0.5 | — | — |
| Dendrimer CYD6100 | 3 | 2 | — | — | 2 | — | — | — |
| Total | 100 | 100 | 100.5 | 101 | 100 | 100 | 100 | 100 |

TABLE 2

| Experiment number | Example 1 | Example 2 | Example 3 | Example 4 | Example 5 | Example 6 | Comparative Example 1 | Comparative Example 2 |
|---|---|---|---|---|---|---|---|---|
| MI(230° C./2.16 kg) g/10 min | 7.8 | 7.8 | 7.9 | 8.5 | 8.5 | 9.8 | 6 | 7 |
| Density g/cm$^3$ | 0.89 | 0.89 | 0.89 | 0.89 | 0.89 | 0.89 | 0.89 | 0.89 |
| Tension (speed: 50 mm) Mpa | 8.1 | 8.2 | 8.3 | 8.1 | 10.2 | 10.8 | 8.2 | 10.9 |
| flexural modulus (speed: 2 mm) Mpa | 302 | 302 | 350 | 302 | 402 | 506 | 350 | 502 |
| Notched Charpy Impact strength Low temperature (−40), KJ/m$^2$ | 85 | 85 | 85 | 85 | 84.9 | 84 | 85 | 85 |
| HDT ° C. | 57.4 | 60.1 | 60.5 | 60.2 | 66.2 | 66.3 | 60 | 66.5 |

Comparison evaluation was performed on Comparative Example 1 and Examples 1 to 4. In the case of Examples 3 and 4, it was confirmed that flowability was improved when the dendrimer (CYD214C) was included. By including a small amount of dendrimer, flowability characteristics of the product were improved by 30-40%, and physical properties showed satisfactory results. In the case of the dendrimer (CYD6100), flowability was improved by about 30% by including 2-3 parts by weight of the dendrimer as shown in Examples 1 and 2, and physical properties showed satisfactory results.

Comparison evaluation was performed on Comparative Example 2 and Examples 5 and 6. In the case of Example 6 including the dendrimer (CYD214C), flowability was improved by 40% by including 0.5 parts by weight of the dendrimer, and physical properties showed satisfactory results. The dendrimer CYD6100 showed the flowability improvement of 20% in the case of Example 5, and in the case of physical properties, flexural modulus was slightly decreased. In the case of the dendrimer CYD214C, an effect of improving flowability was more excellent than that of the dendrimer CYD6100. Thus, flowability was improved by including a small amount of the dendrimer. For the dendrimer used in the present invention, CYD214C is a powder type for flowability improvement, and CYD6100 has a pellet form for impact improvement. The radial structure of the dendrimer improves the flowability of the product because it exhibits a lubricating effect between a PP chain and a POE molecule. In addition, it is expected to show an effect of reducing friction at an interface between a resin and a metal during an injection process. In the case of a compounding products with a high POE content, it is expected that the inclusion of the dendrimer helps improve product moldability. Therefore, in the case of the material for the airbag chute in which impact characteristics are important, the application of the dendrimer can maintain the impact and improve the flowability characteristics. In particular, a satisfactory effect can be obtained even with a small amount of the dendrimer.

According to the present invention, by polymerizing olefin and α-olefin in a block form, including an olefin block copolymer, a crystallization rate is the same, but a high amount of heat is required for crystal melting. Therefore, the present invention has an effect of providing an airbag material that can satisfy low-temperature and high-temperature characteristics required for automobiles.

The present invention has an effect of providing an olefin elastomer composite resin composition for an airbag chute, which improves the dispersion of the elastomer by applying a high-flow elastomer and a low-flow polypropylene, and improves flowability and meltability without deteriorating physical properties by applying the dendrimer.

Although the present invention has been described with reference to the drawings according to embodiments of the present invention, it will be understood by those of ordinary skill in the art that various applications and modifications can be made thereto without departing from the scope of the present invention.

What is claimed is:

1. An olefin elastomer composite resin composition for an airbag chute, comprising 30-80 parts by weight of a polypropylene resin, 30-70 parts by weight of an olefin block copolymer, and 0.1-5 parts by weight of a dendrimer based on 100 parts by weight of the total composition,
   wherein a melt flow index of the dendrimer is 0.1-50 g/10 min at 190° C. and a load of 2.16 kg, and a density of the dendrimer is 0.93-0.95.

2. The olefin elastomer composite resin composition of claim 1, wherein the olefin block copolymer comprises an ethylene and α-olefin polymer.

3. The olefin elastomer composite resin composition of claim 2, wherein α-olefin in the ethylene and α-olefin polymer has 4-10 carbon atoms.

4. The olefin elastomer composite resin composition of claim 1, wherein the polypropylene resin has a melt flow index of 5-10 g/10 min at 230° C. and a load of 2.16 kg.

5. The olefin elastomer composite resin composition of claim 1, wherein a melt flow index of the olefin block copolymer is 10-20 g/10 min at 190° C. and a load of 2.16 kg, a melting temperature is 115° C. to 125° C., and a softening temperature at low temperature is −60° C. to −70° C.

6. The olefin elastomer composite resin composition of claim 1, wherein the dendrimer has at least one selected from the group consisting of olefin-based, nylon-based, amine-based, and acrylate-based terminal functional groups.

7. The olefin elastomer composite resin composition of claim 1, wherein the dendrimer is polymerized through a divergent synthesis method.

8. The olefin elastomer composite resin composition of claim 1, wherein the polypropylene resin comprises a propylene homopolymer or a copolymer of propylene and a monomer of at least one selected from the group consisting of ethylene, 1-butene, 1-pentene, 1-hexene, 1-heptene, and 1-oxene.

* * * * *